United States Patent
Paternoster et al.

(10) Patent No.: US 12,083,738 B2
(45) Date of Patent: Sep. 10, 2024

(54) METHOD, DEVICE, AND RECOATING MODULE FOR PRODUCING A THREE-DIMENSIONAL OBJECT

(71) Applicant: EOS GmbH Electro Optical Systems, Krailling (DE)

(72) Inventors: Stefan Paternoster, Andechs (DE); Stefan Grunberger, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 511 days.

(21) Appl. No.: 15/522,058

(22) PCT Filed: Sep. 15, 2015

(86) PCT No.: PCT/EP2015/071045
§ 371 (c)(1),
(2) Date: Apr. 26, 2017

(87) PCT Pub. No.: WO2016/066317
PCT Pub. Date: May 6, 2016

(65) Prior Publication Data
US 2017/0326792 A1    Nov. 16, 2017

(30) Foreign Application Priority Data
Oct. 29, 2014 (DE) .......................... 102014222129.3

(51) Int. Cl.
*B29C 64/153* (2017.01)
*B22F 10/14* (2021.01)
(Continued)

(52) U.S. Cl.
CPC ............ *B29C 64/153* (2017.08); *B22F 10/28* (2021.01); *B22F 12/50* (2021.01); *B22F 12/63* (2021.01);
(Continued)

(58) Field of Classification Search
CPC ... B29C 64/214; B29C 64/218; B29C 64/255; B29C 64/165; B29C 64/141;
(Continued)

(56) References Cited

U.S. PATENT DOCUMENTS

| 6,238,614 B1 | 5/2001 | Yang |
| 6,672,343 B1 | 1/2004 | Perret et al. |
| (Continued) | | |

FOREIGN PATENT DOCUMENTS

| DE | 92 18 911 U1 | 4/1996 |
| DE | 199 28 245 A1 | 4/2001 |
| (Continued) | | |

OTHER PUBLICATIONS

PCT International Search Report; dated Dec. 21, 2015; 4 pages.
(Continued)

*Primary Examiner* — Adil A. Siddiqui
(74) *Attorney, Agent, or Firm* — Polsinelli (57) ABSTRACT

A method (V) for producing a three-dimensional object (2) by applying and selectively solidifying a powdery construction material (13) layer by layer includes the steps:
a) applying (Z) a layer of the construction material (13) onto a construction field in a working plane (10) by means of a recoating device (14) moving in a moving direction (B) over the working plane,
b) selectively solidifying (Y) the applied layer of the construction material (13) at positions, which correspond to a cross-section of the object (2) to be produced, and
c) repeating (X) the steps a) and b) until the object is completed.

The construction material is stored during step a) in a recoating unit (40a-e) arranged at the recoating device (14) within a space between two recoating elements (42a, 42b)
(Continued)

mutually spaced apart from each other in the moving direction of the recoating device. At least one recoating element (42b) arranged rearward with respect to the moving direction (B) of the recoating device (14) includes a roller (43a, 43b), by means of which the construction material is applied to the working plane.

14 Claims, 5 Drawing Sheets

(51) Int. Cl.
  *B22F 10/28*    (2021.01)
  *B22F 12/50*    (2021.01)
  *B22F 12/63*    (2021.01)
  *B22F 12/67*    (2021.01)
  *B28B 1/00*    (2006.01)
  *B29C 64/141*    (2017.01)
  *B29C 64/165*    (2017.01)
  *B29C 64/214*    (2017.01)
  *B29C 64/218*    (2017.01)
  *B29C 64/255*    (2017.01)
  *B33Y 10/00*    (2015.01)
  *B33Y 30/00*    (2015.01)

(52) U.S. Cl.
  CPC .............. *B22F 12/67* (2021.01); *B28B 1/001* (2013.01); *B29C 64/141* (2017.08); *B29C 64/165* (2017.08); *B29C 64/214* (2017.08); *B29C 64/218* (2017.08); *B29C 64/255* (2017.08); *B33Y 10/00* (2014.12); *B33Y 30/00* (2014.12); *B22F 10/14* (2021.01)

(58) Field of Classification Search
  CPC ....... B29C 64/153; B33Y 10/00; B33Y 30/00; B22F 3/1055; B22F 2003/1056; B28B 1/001
  See application file for complete search history.

(56) References Cited

U.S. PATENT DOCUMENTS

| | | | |
|---|---|---|---|
| 2001/0050448 A1* | 12/2001 | Kubo | B29C 64/165 |
| | | | 264/308 |
| 2002/0195746 A1 | 12/2002 | Hull et al. | |
| 2002/0195747 A1 | 12/2002 | Hull | |
| 2008/0156263 A1 | 7/2008 | Montero-Escuder | |
| 2009/0068376 A1 | 3/2009 | Philippi | |
| 2010/0228381 A1 | 9/2010 | Matsui | |
| 2011/0223349 A1* | 9/2011 | Scott | B33Y 10/00 |
| | | | 427/532 |
| 2014/0363585 A1* | 12/2014 | Pialot | B22F 3/1055 |
| | | | 427/551 |
| 2015/0343533 A1* | 12/2015 | Park | B28B 7/465 |
| | | | 425/78 |
| 2016/0067929 A1* | 3/2016 | Park | B29C 64/153 |
| | | | 425/162 |
| 2016/0243619 A1* | 8/2016 | Gothait | C09D 11/30 |
| 2017/0341302 A1* | 11/2017 | Höchsmann | B22F 12/57 |

FOREIGN PATENT DOCUMENTS

| | | |
|---|---|---|
| DE | 102005022308 A1 | 11/2006 |
| EP | 2010370 B1 | 11/2007 |
| WO | 1988/002677 A2 | 4/1988 |
| WO | 1993/008928 A1 | 5/1993 |
| WO | 2005/097476 A2 | 10/2005 |
| WO | 2006/033621 A1 | 3/2006 |
| WO | 2008/061764 A1 | 5/2008 |
| WO | 2013/092757 A1 | 6/2013 |

OTHER PUBLICATIONS

Chinese Office Action for Application No. 201580059264.7 dated Jun. 28, 2020, 15 pages.
3D Printing Technology (Revised Edition) Wang Yun Gan et al., pp. 15-17, Huazhong University of Science and Technology Press, Jul. 2014, 5 pages.

* cited by examiner

METHOD, DEVICE, AND RECOATING MODULE FOR PRODUCING A THREE-DIMENSIONAL OBJECT

TECHNICAL FIELD OF THE INVENTION

The present invention relates to a method and a device for producing a three-dimensional object by selectively solidifying a powdery construction material layer by layer by an energy input, as well as to a recoating module for such a device.

BACKGROUND OF THE INVENTION

A method of this kind is for example used for rapid prototyping, rapid tooling, or rapid manufacturing. An example of such a method is known under the name "selective laser sintering or laser melting". Therein, a powder is selectively solidified by selective irradiation with a laser beam.

For the purpose of applying the powder, a device having a bi-directionally movable re-coating device, is described in DE 199 28 245 A1. The recoating device contains two recoater blades which are mutually spaced apart. Within the space between the blades, a powdery construction material is filled, which is then drawn by the recoater blades during the movement of the recoater device in order to yield a smooth and thin layer. Some powder materials are, however, strongly cohesive and thus readily tend to clumping (formation of agglomerates).

WO 88/02677 A2 describes a method for producing parts by selective laser sintering, wherein an accurately measured amount of the powdery construction material is pushed over the construction field by a counter-rotating roller configured to move over the construction field, and is there rolled out to produce a smooth and thin layer. By the rotating roller any agglomerates being present are broken-up. However, by way of safety, thereby always more powder is transported by the roller than necessary to apply the layer. The powder still remaining after the deposition of the layer may be disposed of, which increases the powder consumption, or may be fed back to a powder storage, which increases the amount of work.

SUMMARY OF THE INVENTION

It is the object of the present invention to provide an alternative, preferably improved method, and a corresponding device for producing a three-dimensional object. In that respect, it is desired that the quality of the applied layer is improved, preferably without increasing the powder consumption or the amount of work.

The object is solved by a method according to claim 1, a recoating module according to claim 13 and a device according to claim 14. Embodiments of the invention are each provided in the dependent claims. Therein, the methods may also be embodied by the features of the devices as stated below or in the dependent claims, or vice-versa.

The method according to the invention for producing a three-dimensional object by applying and selectively solidifying a powdery construction material layer by layer, contains the steps: Applying a layer of the construction material onto a construction field in a working plane by means of a recoating device moving in a moving direction over the working plane, selectively solidifying the applied layer of the construction material at positions, which correspond to a cross-section of the object to be produced, and repeating these two steps until the object is completed. Therein, the construction material is stored during the application of the layer in a recoating unit arranged at the recoating device within a space between two recoating elements mutually spaced apart from each other in the moving direction of the recoating device. At least one recoating element, preferably a rearward recoating element with respect to the moving direction of the recoating device, contains a roller, by means of which the construction material is applied to the working plane. With this method it is possible to break-up agglomerates and thus also to generate a homogeneous layer even in case of a strongly cohesive powder. For a given situation powder is consumed only to such an amount as it is necessary to generate the layer, the remainder material remains in the space between the recoating elements for the next layer.

Preferably, the roller is rotated during the application of the layer, according to a more preferable aspect in such a manner, that its moving direction at the surface of the powder layer is equal to the moving direction of the recoating device. Due to the rotational movement, in particular the shear effect in case of the same moving direction of the bottom side of the roller and of the recoating device, agglomerates of the construction material can be destroyed with particular efficiency.

Preferably, the recoating element which comprises the roller by means of which the construction material is applied to the working plane further includes a stripping element, which strips powder adhering to the roller from the roller. By means of this, it is avoided that powder accesses the layer already applied, smoothened and positioned behind the roller in the moving direction from an elevated location of the roller (for example the uppermost point) with respect to the working plane.

Preferably, the recoating element which comprises the roller by means of which the construction material is applied to the working plane, further includes a blade device arranged rearward of the roller of the recoating device in the moving direction, which further densifies the powder. Thus, a larger densification of the powder can be achieved as compared with the roller alone.

Preferably, the blade device includes a surface at its bottom side substantially facing the working plane, which is at least in a region thereof oblique with respect to the working plane, and which preferably slopes upwards in a direction towards the associated roller. Thus, a larger densification can be achieved as compared with a bottom side which extends completely parallel to the working plane.

Preferably, the recoating element, which is arranged frontward in the moving direction of the recoating device, is formed to be substantially mirror-symmetric with respect to the rearward recoating element. Thus, the same kind of layer application can be performed in two opposite recoating directions.

Also, a merely partially mirror-symmetric formation of both recoating elements may be advantageous. For example both recoating elements may be formed and oriented to be mirror-inverted, but may be arranged at different height levels with respect to the working plane. Also a prolongation of one of the recoating elements in this height dimension is possible for example. In general, also only single elements of the frontward or rearward recoating units taken alone may be formed and/or arranged to be mirror-symmetric.

Alternatively, or supplementary, the recoating element which is arranged frontward in the moving direction of the recoating device, includes a roller, the diameter and/or the rotational velocity and/or the surface characteristics of which is different from the roller of the rearward recoating element. Thus, a different kind of layer application can be performed in two opposite directions of movement. Also the recoating element, which is frontward in the moving direction of the recoating device may analogously (alternatively or supplementary to the different arrangement of the rollers) include a blade device, the dimension and/or surface characteristic and/or positioning of which is different from a blade device of the rearward recoating element.

The recoating element which is at front in the moving direction of the recoating device may also include a blade device and no roller. Also by this a different kind of layer application can be performed for example in two opposite moving directions.

Preferably, the afore-mentioned blade device includes at its bottom side, which substantially faces the working plane, a surface, which is at least in a region thereof oblique with respect to the working plane, and which preferably slopes upwards in a direction towards the rearward recoating element. Thus, a higher densification can be achieved as compared with a bottom side extending completely parallel to the working plane.

Preferably, the frontward and/or the rearward recoating element is height-adjustable completely or in parts. Thus, the flexibility of the method can be increased. For example a roller of the recoating element can be formed height-adjustable relative to the blade device of the same or the mutually other recoating element in order to achieve a minute adjustment of the desired layer thickness in relation to the subsequent densification of the layer, etc. Further, it is possible to arrange the recoating device to be rotatable parallel to the working plane by at least 180°. Thus, in a bi-directional movement of the recoating device over the working plane the one recoating element is always arranged frontward in the moving direction and the other one is always arranged rearward.

Preferably, the roller of the frontward and/or rearward recoating element is arranged to be heated. Thus, the powder may already be pre-heated during the application, for example in order to more rapidly reach a temperature of the powder which is necessary or suitable, respectively, for the selective solidification.

Preferably, the space arranged between the recoating elements is large enough in order to receive an amount of the powdery construction material, which amount is at least sufficient to apply a complete powder layer, preferably for applying multiple powder layers. As a complete powder layer it is thereby understood that such a powder layer extends at least over the complete construction field in the moving direction. Thus, it is possible to perform one or multiple application crossings without intermittently having to be driven back to the storage container in order to receive new powder.

A recoating module according to the invention is suitable for equipping and/or retrofitting a device for producing a three-dimensional object by application of a powdery construction material and selectively solidifying the same layer by layer. The device comprises a recoating device suitable for receiving the recoating module and movable over the working plane for application of a layer of the construction material onto a construction field within a working plane, and also comprises a solidification device for selectively solidifying the applied layer of the construction material at positions, which correspond to a cross-section of the object to be produced. The device is arranged and/or controlled to repeat the application and solidification until the object is completed. In the recoating module the construction material is stored within a space between two recoating elements mutually spaced apart in the moving direction of the recoating device. At least one recoating element, preferably a recoating element which is correspondingly arranged rearward in the moving direction of the recoating device, comprises a roller, by means of which the construction material can be applied onto the working plane. Such a recoating module may be flexibly built into the device for producing a three-dimensional object and may enable the same to realize the method according to the invention.

A device according to the invention for producing a three-dimensional object by applying and selectively solidifying a powdery construction material layer by layer comprises an recoating device movable over the working plane for applying a layer of the construction material onto a construction field within a working plane, and a solidification device for selectively solidifying the applied layer of the construction material at positions, which correspond to a cross-section of the object to be produced. The device can be arranged and/or controlled to repeat the application and solidification until the object is completed. The recoating device includes at least one recoating unit in which the construction material is stored within a space between two recoating elements mutually spaced apart from each other in the moving direction of the recoating device. At least one recoating element, preferably a recoating element, which is arranged rearward in the moving direction of the recoating device, contains a roller, by means of which the construction material can be applied to the working plane. With such a device the method according to the invention can be realized.

Preferably, the recoating unit of the device is a replaceable recoating module. Thus, depending on the powder being used, a suitable module may be selected and flexibly be mounted to the device.

BRIEF DESCRIPTION OF THE DRAWINGS

Further features and advantages of the invention are derived from the specification of embodiments by means of the appended drawings.

DETAILED DESCRIPTION OF THE EMBODIMENTS

Figure 1:
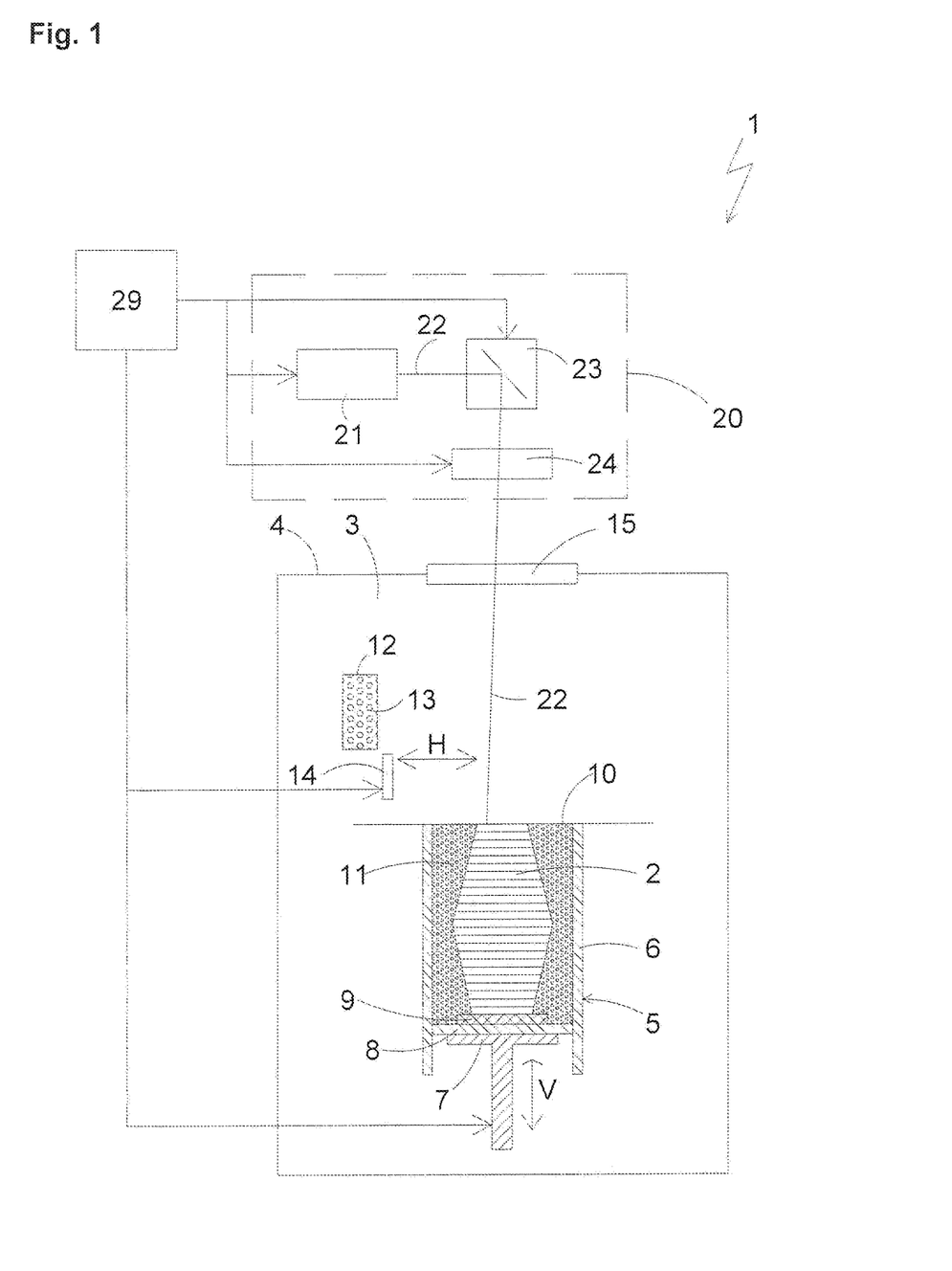
FIG. 1 is a schematical view partially illustrated in cross-section of an embodiment of a device for producing a three-dimensional object layer by layer, which is suitable to perform a method according to the invention.

In the following, an embodiment of a device 1 is explained with reference to FIG. 1, which device 1 is suitable to perform a method according to the invention. The device illustrated in FIG. 1 is a laser sintering or laser melting device 1. In order to construct an object 2, it includes a process chamber 3 having a chamber wall 4.

In the process chamber 3 a container 5 which is open at the top is arranged having a wall 6. In the container 5 a carrier 7 is arranged being movable in a vertical direction V and at which is mounted a base plate 8, which closes the container 5 at the bottom and thereby forms its base. The base plate 8 may be a plate formed separately from the carrier 7 and which is mounted at the carrier 7, or it may be formed integrally with the carrier 7. Depending on the powder used and the process performed, a construction platform 9 on which the object 2 is constructed may be mounted to the base plate 8. The object 2 may, however, also be constructed on the base plate 8 itself, which then serves as a construction platform. In FIG. 1 the object 2 to be formed in the container 5 on the construction platform 9 is illustrated below a working plane 10 in an intermediate state including multiple solidified layers, surrounded by remaining non-solidified construction material 11.

The laser sintering device 1 further contains a storage container 12 for receiving a powdery construction material 13 which is solidifiable by means of electromagnetic radiation, and a recoater 14 movable in a horizontal direction H for application of the construction material 13 onto the working plane 10. At its topside the wall 4 of the process chamber 3 includes a coupling-in-window 15 for the radiation 22 which serves to solidify the powder 13.

The laser sintering device 1 further contains an exposure device 20 having a laser 21, which generates a laser beam 22, which is re-directed through a re-direction device 23 and focused through the coupling-in-window 15 onto the working plane 10 by means of a focusing device 24.

Further, the laser sintering device 1 includes a control unit 29, by means of which the individual constituent parts of the device 1 are controlled in a coordinated manner in order to perform the construction process. The control unit may include a CPU, which is operated and controlled by a computer program (software). The computer program may be stored separately from the device on a storage medium, from which it may be loaded into the device, particularly into the control unit.

Figure 2:
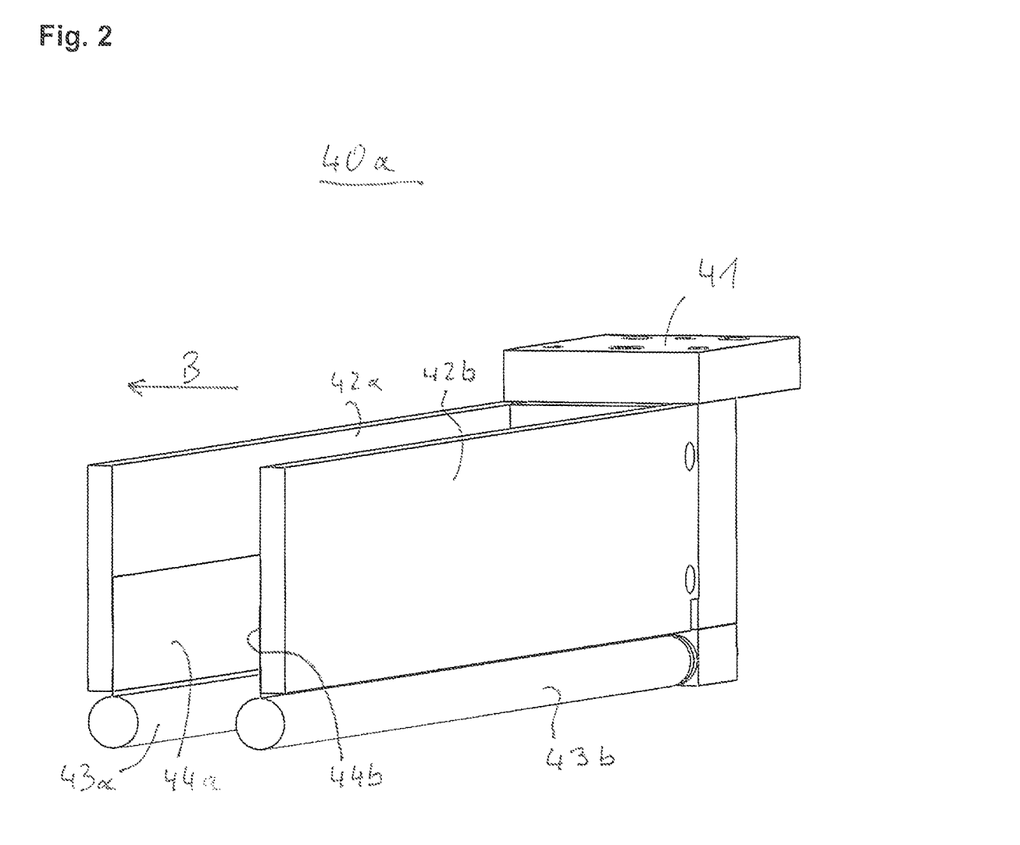
FIG. 2 is a schematical perspective view of a recoating unit according to a first embodiment of the present invention.

FIG. 2 shows a schematical perspective view of a recoating unit 40a which is included in the recoater 14.

The recoating unit 40a contains a holder 41, through which it can be mounted at the re-coater 14 (for example at an actuator unit of the recoater 14 not being illustrated). The recoating unit 40a further contains two substantially parallel and plate-shaped recoating elements 42a, 42b, which extend substantially perpendicular to the working plane 10 and perpendicular to the moving direction B of the recoater 14, and which are mutually spaced apart in the moving direction B of the recoater 14. In FIGS. 2 through 6 the moving direction B of the recoater 14 extends transversely into the plane of the drawing, such that the recoating element 42a is the forward recoating element in the movement direction B and the recoating element 42b is the rearward recoating element.

Both recoating elements 42a, 42b being mutually spaced apart from each other delimit a space in and against the moving direction B, respectively, and which serves to receive powdery construction material 13 from the storage container 12. This space is also limited in a direction transverse to the moving direction B, which is, however, not shown in the figures for the purpose of clarity. The space arranged between the recoating elements 42a, 42b is large enough in order to receive an amount of powder, which amount is sufficient to apply at least one powder layer, preferably to apply multiple layers.

In order to apply the powder received in the space between the recoating elements 42a, 42b, i.e., construction material 13, onto the working plane 10, each recoating element includes at its bottom side (i.e., the side facing into the direction of the working plane 10) a rotatably supported roller 43a, 43b, having a longitudinal axis (=rotational axis) extending parallel to the working plane 10 and transverse to the moving direction B of the recoater 14. Moreover, strippers 44a, 44b are arranged at the inner faces of each recoating element 42, 42b (i.e., on a side facing towards the other recoating element, respectively), for example in the form of thin metal sheets or Kapton strips, which bridge the gap above the rollers 43a, 43b. Finally, a drive (not shown in the figures, for example a motor-based drive, a gear rack drive or a wire drive) is provided in order to effect rotation of the rollers 43a, 43b.

In operation, in order to apply a powder layer, the carrier 7 is at first lowered by a height difference, which corresponds to the desired layer thickness. Employing the recoater 14 a layer of the powdery construction material 13 is then applied. The application is carried out at least over the whole cross-section of the object 2 to be produced, preferably over the complete construction field, i.e., the region of the working plane 10 which is positioned within the top opening of the container 5. Subsequently, the cross-section of the object 2 to be produced is scanned by the laser beam 22, such that the powdery construction material 13 is solidified at positions, which correspond to the cross-section of the object 2 to be produced. These steps are repeated until the object 2 is completed and can be removed from the construction space.

The application of the powder layer is carried out by moving the recoater 14 horizontally in the moving direction B over the working plane 10. Therein, it is at first moved to the storage container 12, where it receives a predetermined amount of powder and stores it within the space between the recoating elements 42a, 42b. Thereafter it is moved over the construction field. Thereby, a layer of the powdery construction material 13 received between the recoating elements 42a, 42b remains on the construction field, wherein the thickness of the layer corresponds to the vertical distance between the bottom side of the rollers 43a, 43b and the topside of the carrier 7 or of the layer which has previously been applied, i.e., the height difference by which the carrier has previously been lowered. Since the space arranged between the recoating elements 42a, 42b is large enough in order to receive an amount of powder, which is sufficient to at least apply one powder layer, preferably to apply multiple layers, it is possible to perform one, or multiple application movements without a necessity to be moved back intermittently to the storage container 12 for receiving new powder.

During the movement of the recoater 14 the rollers 43a, 43b are effected to be rotated. By means of this a homogenously smoothened layer is achieved. The strippers thereby prevent that due to the rotation of the rollers powder accesses the previously applied and smoothened layer from the highest point at the roller (or a higher position, respectively).

The rotational velocity of the rollers is preferably adjustable in a stepless manner. The direction of rotation is thereby selected such that the moving direction of the rollers at the surface of the powder is equal to the moving direction of the recoater 14 (so-called counter-rotating roller). The shear effect achieved thereby increases the effect of breaking-up the agglomerates.

Since the roller in the recoating unit does not have an object to transport powder from a storage container over the complete construction field, but rather the powder is supplied from a top direction via the intermediate space between both recoating elements, the roller diameter may considerably be reduced as compared with the afore-mentioned prior art and the values which had been disclosed therein ranging from 50 mm up to 80 mm, are reduced for example to 10 mm to 18 mm.

The recoating unit 40*a* shown in FIG. 2 is formed to be substantially mirror-symmetric. Thus, an application may be carried out opposite to the moving direction B shown in FIG. 2 in the same manner as in the moving direction B.

Both recoating elements of the recoating unit 40*a* may, however, also include rollers which are different from each other, which may for example deviate from each other in its diameter and/or its rotational velocity and/or its surface characteristics. By means of that, different kinds of layer applications may be performed depending on the recoating device direction. For example, a pre-application of a layer can be effected initially in one direction of the recoating device, and subsequently a post-application of a layer may then be effected in the opposite direction, which are both carried out with distinct parameters.

Figure 3:
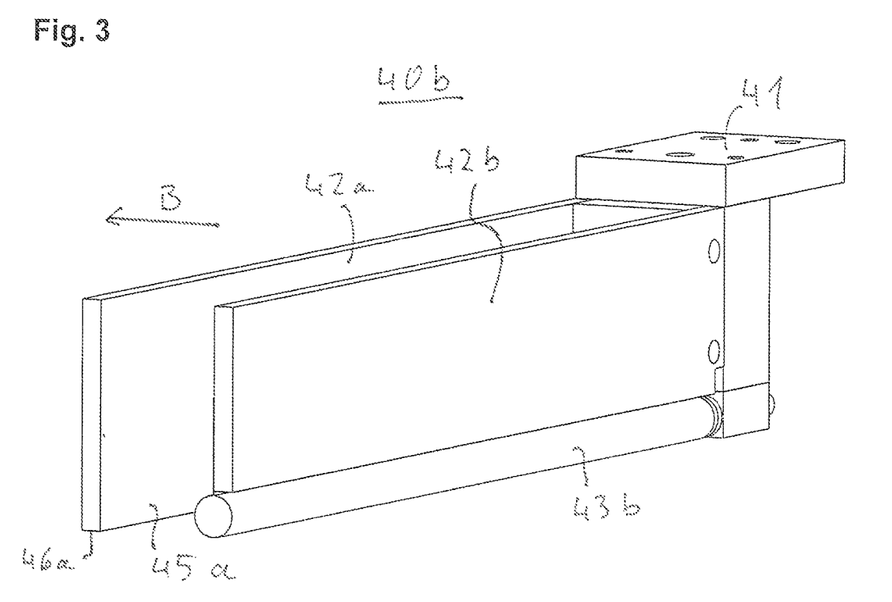
FIG. 3 is a schematical perspective view of a recoating unit according to a second embodiment of the present invention.

FIG. 3 shows an recoating unit 40*b* according to a second embodiment. This recoating unit 40*b* deviates from the recoating unit 40*a* shown in FIG. 2 in that only the rearward recoating element 42*b* as seen in the moving direction B of the recoater 14 contains a roller 43*b*, but the frontward recoating element 42*a* does not contain a roller.

The frontward recoating element 42*b* instead includes a blade device 45*a*, which in the simplest case as shown in the figure, is formed by a prolongation of the plate-shaped recoating element 42*a* into the bottom direction. This blade may serve on the one side to smoothen the solidified sections of the previous powder layer and to remove projecting parts. On the other side, however, different kinds of layer applications may be performed depending on the recoating device direction similar to the afore-mentioned unsymmetric arrangement of the recoating unit 40*a*.

In the recoating unit 40*b* shown in FIG. 3 the bottom side 46*a* of the blade device 45*a* facing the working plane 10 is parallel to the working plane 10. Thus, a low-shear powder application without densification can be achieved.

Figure 4:
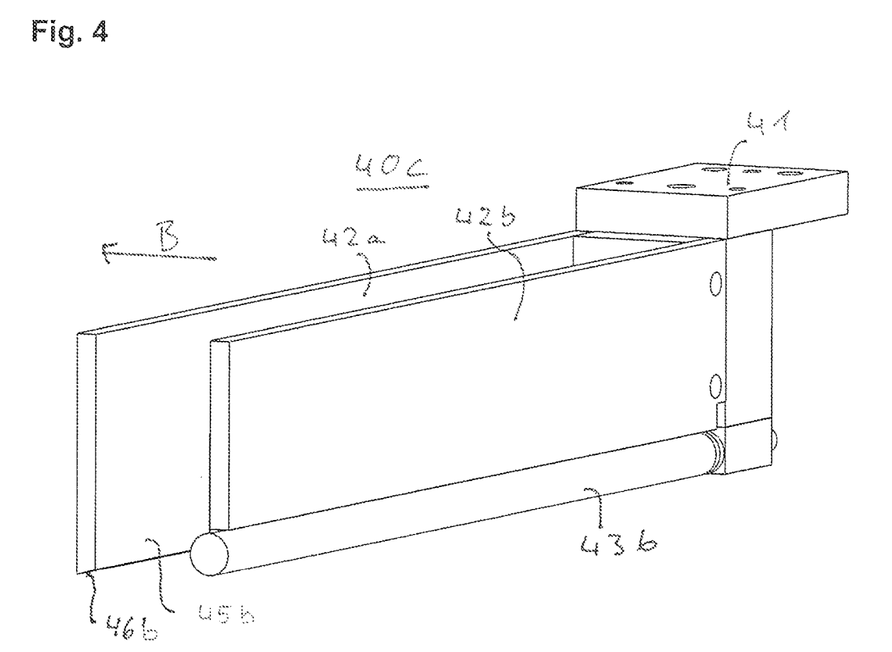
FIG. 4 is a schematical perspective view of a recoating unit according to a modification of the second embodiment.

In an recoating unit 40*c* shown in FIG. 4 according to a modification of the second embodiment, the bottom side 46*b* of the blade device 45*b* facing the working plane 10 extends at an angle with respect to the working plane 10. Therein, the bottom side slopes upwards in the direction towards the rear recoating element 42, i.e., opposite to the recoating device direction B shown in FIG. 4. Thus, upon application of a layer opposite to direction B, i.e., a powder application by the blade device 45*b*, a densification of the applied powder is achieved.

The bottom side of the blade device may also be arranged such that it includes a section extending parallel to the working plane as well as a section extending at an angle with respect to the working plane. In addition to an inclined face, the section not extending parallel to the working plane or the whole bottom side of the blade device may also include a convex rounding, or a multiple-edged surface adapted to a convex rounding.

The expression "blade device" is herein not restricted to a prolongation of the plate-shaped recoating element 42*a* into a bottom direction. A blade device may rather also include a separate blade, a ridge, a knife, a brush, a doctor blade, or the like.

Figure 5:
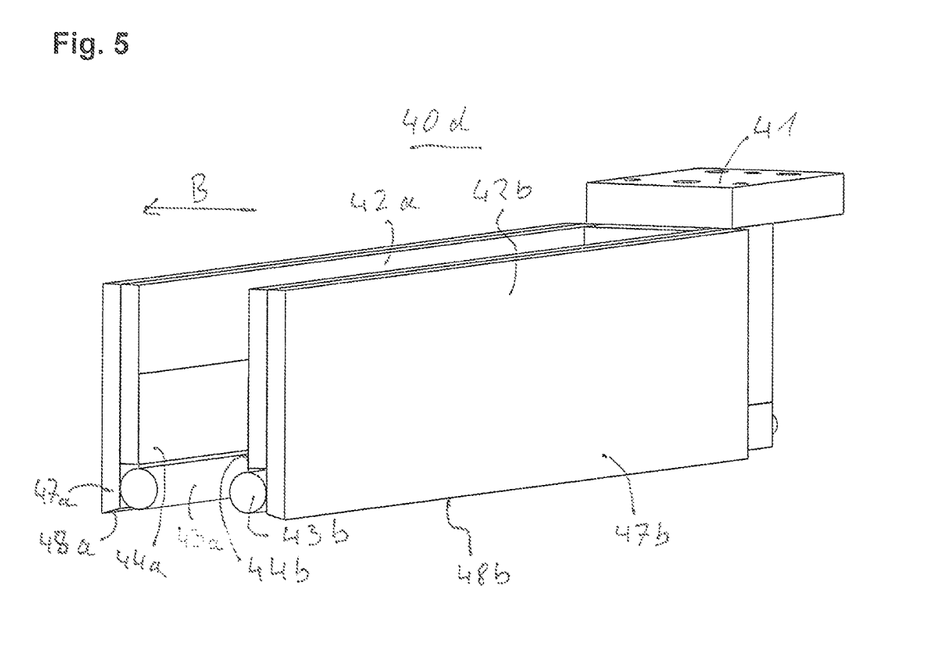
FIG. 5 is a schematical perspective view of a recoating unit according to a third embodiment of the present invention.

FIG. 5 shows an recoating unit 40*d* according to a third embodiment. This recoating unit 40*d* deviates from the recoating unit 40*a* shown in FIG. 2 in that both recoating elements 42*a*, 42*b* each include an additional blade device 47*a*, 47*b* at their outer faces facing away from each other. The bottom sides 48*a*, 48*b* of the additional blade devices 47*a*, 47*b* are positioned lower than the bottom sides of the rollers 43*a*, 43*b* by a predetermined height value. Since the blade devices 47*a*, 47*b* are positioned rearward of the rollers in case of a powder application using the rollers (in the application direction B for the roller 43*b*, and opposite to the application direction B for the roller 43*a*), these blade devices 47*a*, 47*b* may serve to further densify the powder layer applied by the rollers.

Similar to the recoating units 40*b* and 40*c*, each of the bottom sides of the additional blade devices may be arranged such that these are parallel to the working plane (as shown in FIG. 5 with respect to the example of the bottom side 48*b* of the blade device 47*b*), such that these extend at an angle with respect to the working plane (as shown with respect to the example of the bottom side 48*a* of the blade device 47*a*, which is sloped upwards in a direction towards the associated roller 43*a*), or such that these include a section extending parallel to the working plane as well as a section extending at an angle with respect to the working plane. Thus, the same effects as shown with respect to the recoating units 40*b* and 40*c* are achieved.

In addition to an inclined face, the section extending not parallel to the working plane, or the whole bottom side of the blade device may also include a convex rounding or a multiple-edged surface adapted to a convex rounding. Also herein, the expression "blade device" may include a blade, a ridge, a knife, a brush, a doctor blade or the like.

Similar to the recoating unit 40*a* shown in FIG. 2 also the recoating unit 40*e* may be arranged to be substantially mirror-symmetric, or may include rollers deviating from each other.

Figure 6:
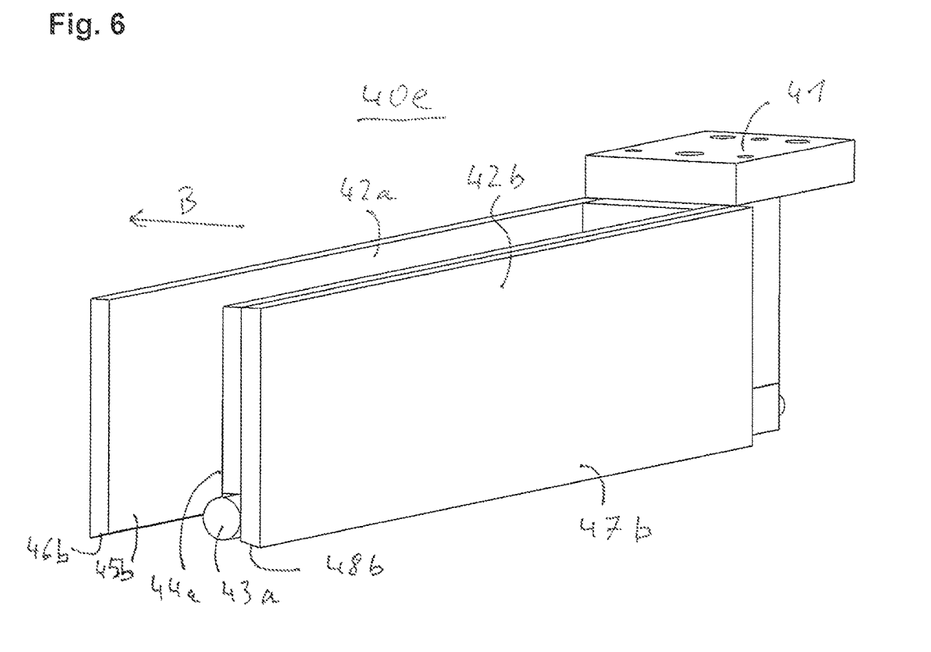
FIG. 6 is a schematical perspective view of a recoating unit according to a fourth embodiment of the present invention.

FIG. 6 shows a recoating unit 40*e* according to a fourth embodiment. In the recoating unit 40*e* the recoating element 42*b* includes an additional blade device 47*b* as shown with respect to the recoating unit 40*d* shown in FIG. 5, while the recoating element 42*a* includes only a blade device 45*b* instead of a roller as shown with respect to the recoating unit 40*c* shown in FIG. 4.

Also in other cases features of the various embodiments may be combined with each other where appropriate.

In the above-described embodiments the recoating unit is described in each case as a replaceable recoating module, which is mounted at the recoater and may be released from the same. However, the recoating unit may also be formed integrally with the recoater.

The arrangement as a replaceable recoater module has, however, an additional advantage in that different recoater modules according to the above-described embodiments may be provided and can be quickly and flexibly replaced with each other. Besides mechanical quantities such as the distance between the recoating elements or the diameter of the rollers also the surface characteristics of the rollers or the achievable roller temperatures or rotational velocities may for example be varied. Therein, the recoating module to be used may be selected according to the kind of the powder used.

The shape of the recoating elements is not restricted to the described plate shapes and the orientation perpendicular to the working plane. The recoating elements may have an arbitrary shape and position, which are suitable to limit a space for receiving a powdery construction material. In particular, the lateral limitation of the powder storage in and/or opposite to the movement direction of the recoater may also be solely formed by the roller, if it has a sufficiently large diameter.

One of the recoating elements or both may be arranged to be height-adjustable.

A roller or both rollers may be arranged to be heated.

Figure 7:
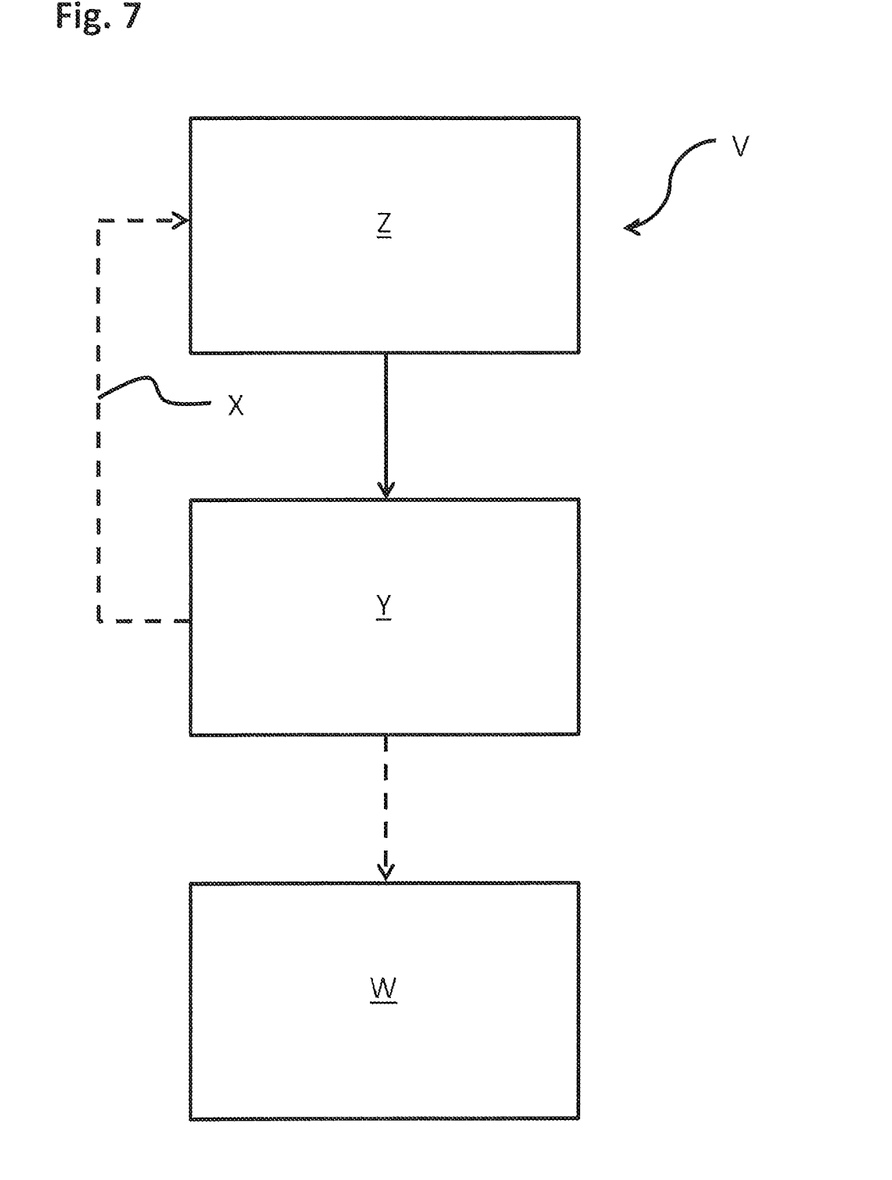
FIG. 7 is a schematical block view of the procedural flow of an embodiment of a method according to the invention.

FIG. 7 shows in a schematical block illustration the procedural flow of an embodiment of a method V according to the invention. Therein it is referred to the numerals in the previous figures. In a first step Z a layer of construction material 13 is applied to a construction field within a working plane 10 by means of an recoating device 14 (according to the invention) moving in a moving direction B over the working plane 10. In a second step Y the applied layer of the construction material 13 is selectively solidified at positions which correspond to a cross-section of the object 2 to be produced. Both steps Z and Y are repeated by repetitions X until the object 2 is finished. This finishing is denoted as a last step W.

Even when the present invention has been explained by means of a laser sintering device or a laser melting device, respectively, it is not restricted to laser sintering or laser melting. it can rather also be applied to arbitrary methods for producing a three-dimensional object by applying and selectively solidifying a powdery construction material layer by layer.

The laser may for example comprise a gas or solid body laser or any other kind of laser. Generally, any device can be used to selectively input energy onto a layer of the construction material. Instead of a laser an electron beam or any other energy or radiation source may be used, which is suitable to solidify the construction material. The invention may also be applied to the selective mask sintering, wherein an extended light source and a mask are used, or may be applied to the absorption or inhibition sintering, respectively.

Instead of inputting energy, the selective solidification of the applied construction material may also be performed by means of 3D-printing, for example by applying an adhesive. Generally the invention is related to the production of an object by means of applying and selectively solidifying a powdery construction material layer by layer independent from the kind and manner in which the construction material is solidified.

Various kinds of powder may be used, in particular metal powder, plastic powder, ceramic powder, sand, filled or mixed powders.

The invention claimed is:

1. A method for producing a three-dimensional object by applying and selectively solidifying a construction material layer by layer in a construction field in a working plane, including the steps:
providing the construction material in a storage container in sufficient quantity to complete an entire build of an object with the storage container fixedly located relative to the construction field and above the working plane;
applying a layer of the construction material onto the construction field in the working plane by a reciprocating recoating device moving in a moving direction over the working plane;
selectively solidifying the applied layer of the construction material at positions corresponding to a cross-section of the object; and
repeating the application of the layer and the selective solidifying of the applied layer until the object is completed,
the construction material being periodically supplied to the recoating device during a build process by moving the recoating device to the storage container, where the recoating device receives a predetermined amount of construction material sufficient for at least one layer and then moves away from the storage container, the recoating device having a first recoating element and a second recoating element, the first recoating element and the second recoating element being plate-shaped recoating elements that extend substantially perpendicular to the working plane and substantially perpendicular to the moving direction of the recoating device, the first recoating element and the second recoating element being mutually spaced apart from each other in the moving direction of the recoating device, the first recoating element being arranged in front and the second recoating element being arranged at a back of the recoating device with respect to the moving direction of the recoating device, and wherein the predetermined amount of construction material is received within a space that is delimited between the first recoating element and the second recoating element;
the second recoating element comprising a second recoating element roller rotatably supported at the plate-shaped second recoating element, the construction material being applied to the working plane and smoothed into a layer by the second recoating element, and
the second recoating element further including an elongated blade device arranged rearward of the second recoating element roller in the moving direction and extending across the construction field, the second recoating element roller defining a roller plane in movement relative to the construction field, the blade device having a lowermost edge defining a blade plane which is below that of the roller plane, the blade device further smoothing the construction material of the layer, and
the blade device of the second recoating element including a surface at a bottom side of the blade device facing the working plane, at least a part of the surface being oblique with respect to the working plane or sloping upwards in a direction towards the second recoating element roller, the oblique surface part contacting construction material in the roller plane to apply a force to the construction material pressing it below the roller plane to densify the construction material of the layer.

2. A method according to claim 1, wherein the second recoating element roller is rotated during the application of the layer.

3. A method according to claim 2, wherein the second recoating element roller is rotated during the step of applying a layer of the construction material in such a manner that its moving direction at the surface of the powder layer is equal to the moving direction of the recoating device in a counter-rotating manner.

4. A method according to claim 1, wherein a recoating element roller further includes a stripping element that strips powder adhering to the second recoating element roller from the second recoating element roller.

5. A method according to claim 1, wherein the first recoating element is symmetric with respect to the second recoating element.

6. A method according to claim 1, wherein the first recoating element includes a first recoating element roller, the diameter and/or the rotational velocity and/or the surface characteristics of the first recoating element roller being different from that of the second recoating element roller.

7. A method according to claim 1, wherein the first recoating element includes a blade device.

8. A method according to claim 7, wherein the blade device includes a surface at a bottom side of the blade device facing the working plane, at least a part of the surface being oblique with respect to the working plane or sloping upwards in a direction towards the second recoating element, the oblique surface part contacting construction material and densifying the construction material.

9. A method according to claim 1, wherein the first recoating element and the second recoating element are height-adjustable relative to each other.

10. A method according to claim 1, wherein the roller of the second recoating element is heated and/or wherein the first recoating element comprises a roller that is heated.

11. A method according to claim 1, wherein the space arranged between the first recoating element and the second recoating element is sized in order to receive an amount of the construction material sufficient to apply plural layers.

12. A method according to claim 1, wherein the first recoating element and the second recoating element of the recoating device are provided as a replaceable recoating module.

13. A method for producing a three-dimensional object by applying and selectively solidifying a construction material layer by layer in a construction field in a working plane, including the steps:
provinding the construction material in a storage container in sufficient quantity to complete an entire build of an object with the storage container fixedly located relative to the construction field and above the working plane;
applying a layer of the construction material onto the construction field in the working plane by a reciprocating recoating device moving in a moving direction over the working plane;
selectively solidifying the applied layer of the construction material at positions corresponding to a cross-section of the object; and
repeating the application of the layer and the selective solidifying of the applied layer until the object is completed,
the construction material being periodically supplied to the recoating device during a build process by moving the recoating device to the storage container, where the recoating device receives a predetermined amount of construction material sufficient for at least one layer and then moves away from the storage container, the recoating device having a first recoating element and a second recoating element, the first recoating element and the second recoating element being plate-shaped recoating elements that extend substantially perpendicular to the working plane and substantially perpendicular to the moving direction of the recoating device, the first recoating element and the second recoating element being mutually spaced apart from each other in the moving direction of the recoating device, the first recoating element being arranged at a front and the second recoating element being arranged at a back of the recoating device with respect to the moving direction of the recoating device, and wherein the predetermined amount of construction material is received within a space that is delimited between the first recoating element and the second recoating element; and
the second recoating element comprising a second recoating element roller rotatably supported at the plate-shaped second recoating element, the construction material being applied to the working plane by the second recoating element, and
the second recoating element further including an elongated blade device arranged rearward of the second recoating element roller in the moving direction and extending across the construction field, the second recoating element roller defining a roller plane in movement relative to the construction field, the blade device having a lowermost edge defining a blade plane which is below that of the roller plane, the blade device located to follow immediately behind the second recoating element roller by a distance just sufficient to not touch the second recoating element roller.

14. The method of claim 13, wherein the blade device of the second recoating element including a surface at a bottom side of the blade device facing the working plane, at least a part of the surface being oblique with respect to the working plane or sloping upwards in a direction towards the second recoating element roller, the oblique surface part contacting construction material in the roller plane to apply a force to the construction material pressing it below the roller plane to densify the construction material of the layer.

* * * * *